United States Patent
Karapetyan et al.

(10) Patent No.: US 6,819,079 B2
(45) Date of Patent: Nov. 16, 2004

(54) APPARATUS FOR PROLONGING RECHARGEABLE BATTERY LIFE AND POWER IN A WIRELESS COMMUNICATING HAND-HELD SYSTEM

(75) Inventors: Armen Karapetyan, 1935 N. Van Ness Ave., Los Angeles, CA (US) 90068; Yuri Grigoryants, Glendale, CA (US)

(73) Assignees: Armen Karapetyan, Los Angeles, CA (US); Yuri Grigoryats, Glendale, CA (US)

( * ) Notice: Subject to any disclaimer, the term of this patent is extended or adjusted under 35 U.S.C. 154(b) by 86 days.

(21) Appl. No.: 10/396,791

(22) Filed: Mar. 25, 2003

(65) Prior Publication Data

US 2004/0189244 A1 Sep. 30, 2004

(51) Int. Cl.[7] .................................................. H02J 7/00
(52) U.S. Cl. ........................ 320/102; 320/101; 136/291
(58) Field of Search ................................. 320/102, 101, 320/103, 114; 136/291, 293; 323/906

(56) References Cited

U.S. PATENT DOCUMENTS

| | | | |
|---|---|---|---|
| 5,369,798 A | 11/1994 | Lee | 455/33.1 |
| 5,627,882 A | 5/1997 | Chien et al. | 399/61 |
| 5,884,196 A | 3/1999 | Lekven et al. | 455/574 |
| 5,898,932 A | 4/1999 | Zurko et al. | 455/573 |
| 6,078,819 A | 6/2000 | Ciccone et al. | 455/463 |
| 6,127,797 A | 10/2000 | Walker | 320/101 |
| 6,483,275 B1 * | 11/2002 | Nebrigic et al. | 320/135 |

* cited by examiner

Primary Examiner—Lawrence Luk

(57) ABSTRACT

An apparatus for prolonging rechargeable battery life and power in a wireless communicating hand-held system provides a possibility to enhance a power saving of the power supply in the wireless communicating hand-held units, such as cellular telephone. An improved apparatus for prolonging rechargeable battery life and power in a wireless communicating hand-held system includes a solar battery, the positive pole of which is connected to the positive pole of the rechargeable battery and to the anode of the indicator, and the negative pole of the solar battery is connected to the first contact of the switch and to anode of the blocking device. The cathode of the blocking device is connected to the negative pole of the rechargeable battery and the second contact of the switch is connected to the cathode of the indicator.

3 Claims, 2 Drawing Sheets

APPARATUS FOR PROLONGING RECHARGEABLE BATTERY LIFE AND POWER IN A WIRELESS COMMUNICATING HAND-HELD SYSTEM

FIELD OF THE INVENTION

This invention is generally related to wireless telephones and more particularly to an apparatus employed in a wireless telephone for providing increased functionality and for extending the useful battery life and power of portable wireless communicating units, such as a portable cellular radio telephone.

BACKGROUND OF THE INVENTION

In a wireless telephone communication system, many users communicate over a wireless channel to connect to other wireless telephone systems. Communication over the wireless channels is mostly provided by the mobile/portable cellular telephones including a power supply, such as a battery. Generally the portable cellular radio telephone includes elements using a low operating current to save the power of a battery. Also, for example, in the mobile radio telecommunication units like a paging systems, it is so made as to intermittently receive the power supply of the battery only required for a signal reception during the idle state.

For example, the apparatus saving the power of a battery used in a portable radio telephone by U.S. Pat. No. 5,369,798 performs the channel scanning for one of the two channel systems "A" and "B" divided from a cellular service band to select two channels with largest RSSIs (Received Signal Strength Indicator) signals. The main processor determines which one of the two channels receives the data, so as to tune the telephone to the channel that receives the data, and stands by. The main processor stops the operation during detecting word synchronization signal, thus saving the battery power. A portable radio telephone for saving the power of a battery selects a first channel and a second channel by channel tuning. There are two modes: the first mode—the portable radio telephone is tuned to the first channel and set up a first interrupt time interval (C timer setting) during which the main processor is stopped and the word synchronization data is detected, and causes the main processor to resume the normal operation to receive overhead message when detecting the word synchronization data and then to be in standby; the second mode—the portable radio telephone is tuned to the second channel when the word synchronization data is not detected in the first channel, and performs the first interrupt time interval setting and word synchronization detection steps to detect the word synchronization data in the second channel. The portable radio telephone counts the number of the fails to detect the word synchronization data in the second channel, and checks whether the power-off mode is set for the outside of the service area of the network. The second interrupt time interval (V timer) set up to stop the main processor and to again perform the above processing steps when the power-off mode is not set or the number of the fails exceeds a given value, and the portable radio telephone is switched off when the number of the fails equals the given value.

Such apparatus is complex and expensive, considering the necessity of channel scanning for one of the two channel systems in order to determine which one of the two channels receives the data, so as to tune the telephone to the channel that receives the data, and stands by.

In another apparatus by U.S. Pat. No. 5,884,196, in order to reduce the power consumption of a remote unit in a dispatch system the remote unit enters a dormant state. A base station transmits a forward link broadcast signal and monitors a common access channel. A first remote unit continually receives and decodes the forward link broadcast signal and determines whether said forward link broadcast signal comprises active signals. If the remote unit determines that the forward link broadcast signal comprises no active signals for some a duration, the first remote unit enters a dormant mode. In the dormant mode the remote unit sporadically receives and decodes said forward link broadcast signal. If this remote unit or any other remote unit on the same net presses a push to talk button, it transmits a message on the common access channel. In response, every remote unit on the net which is in a dormant state exits the dormant state and continually monitors the forward link signal.

This apparatus is also expensive and complex, considering the requirement of continually receiving and decoding the forward link broadcast signal and determining whether said forward link broadcast signal comprises active signals.

Another apparatus, enhancing power saving for hand-held communications system by U.S. Pat. No. 5,627,882 divides the standby time of the communication system into a scanning mode and a sleep mode having several different levels to allow the system to enter the scanning mode intermittently. Each level of the sleep mode corresponds to a given length of delay time between two successive scanning periods. The communication system enters different levels of the sleep mode in accordance with the standby time history. The more standby time that passes, the longer the sleep time for the level that the system may enter. This reduces the scan rate when the system is not used for a long period. The operation of the communication system is divided into a TALK MODE TM in which both the transmitter and the receiver are active to enable the receipt and transmission of signals and data and a STANDBY MODE in which the transmitter is deactivated to minimize power consumption and the receiver is repeatedly activated and deactivated in an intermittent fashion. The STANDBY MODE period is thus further divided into SCANNING MODE in which the receiver is active for scanning the incoming signals for a given scanning period and SLEEP MODE in which the receiver is deactivated to further reduce power consumption. The receiver is activated to scan the incoming signals per unit time is changing in accordance with the standby time history. Namely, the scan rate is no longer fixed as in the conventional cordless phone systems but is now a function of the standby time. The purpose of changing the scan rate in accordance with the standby time is to cut down the scan rate when the communication system is used less frequently, e.g., at night, and to increase the scan rate when the communication system is used more frequently, e.g., during the day time. The standby time is divided into different time zones by, for example, two hours, the first one being 0–2 hour, the second one 2–4 hour, the third one 4–6 and so on. In each of the time zones, a different delay level in scanning operation is set, for example, in the 0–2 time zone, the scanning is carried out every two seconds with a 400 ms scanning period. In the next (2–4) time zone, scanning is conducted at every 5 seconds with the same scanning period. The scanning is carried out at every 10 seconds for the third (4–6) time zone. Once an incoming call is picked up or an outgoing signal is attempted, the whole system will be reset to interrupt the above procedure and restart the delay procedure using the first time zone.

This apparatus requires additional circuitry for division of the communication system standby time into a scanning mode and a sleep mode having several different levels to allow the system to enter the scanning mode intermittently.

In another apparatus for prolonging battery life is described in U.S. Pat. No. 6,078,819, a cordless telephone arranged for operation in a frequency hopping system provides for conserving battery power in a portable unit when this unit is located remote from its charging station and in a standby state. While in the standby state, the portable unit resides in a low power monitoring mode which includes deactivating certain internal circuitry and periodically activating and deactivating other selected internal circuitry for conserving battery power. When the portable unit is periodically activated from a deactivated state, battery power is conserved through an adaptive operation that reduces considerably the length of time that the selected internal circuitry needs to remain turned on. This reduced on-time period for the selected internal circuitry is provided as long as the base unit is detected as frequency hopping with at least one other of the portable units in the system. If the base unit is not detected as frequency hopping, however, the length of time that the selected internal circuitry remains on is left at its normal, unreduced on-time period. Energy savings for a portable unit operating with the reduced on-time period are significantly greater than those realized when the portable unit is operated with the normal, unreduced on-time period. Another portable unit operating as the base unit may also provide a frequency hopping signal suitable for use by the adaptive operation in providing the reduced on-time period for the internal circuitry of the portable unit.

Such apparatus requires deactivating certain internal circuitry and periodically activating/deactivating other selected internal circuitry for conserving battery power.

The apparatus by U.S. Pat. No. 5,898,932 comprises the portable cellular telephone with a rectangular configuration, the rectangular solar panel having an area of at least 15 square inches; the pair of rechargeable batteries, the conventional recharging stand including a rectangular base with the cord, the switch selecting the supply of power, etc.

This device requires rectangular configuration of the cellular telephone, the rectangular solar panel having an area of at least 15 square inches, the pair of rechargeable batteries, and the conventional recharging stand with a cord, etc.

Another U.S. Pat. No. 6,127,797 describes the light-operated telephone including the solar array battery subsidizer or charger comprising a solar array, power regulators connected to the solar array, negative and positive battery charging contacts connected to the power regulators, and means for transmitting light connecting the solar array to the power regulators and connecting the power regulators to the battery charging contacts. The solar rechargeable battery is one source of power (i.e. a primary power source). In addition, a non-solar rechargeable battery is a secondary power source. The light, received by photoelectric sensors, is converted into electro-magnetic two-way power by the solar array. Voltage charge is controlled and regulated by the power regulators which avoid overcharge of the batteries. Light is transferred from the solar array to the power regulators and from the power regulators to the negative and positive battery charging contacts via the means for transmitting light. The solar battery is recharged or subsidized by the solar array battery subsidizer upon contacting the negative and positive battery charging contacts.

The described device requires the power regulators connected to the negative and positive battery charging contacts via the means for transmitting light.

Thus, there is a great need in the art for the improved apparatus for prolonging rechargeable battery life and power in a wireless communicating hand-held system, providing not expensive, convenient, economical and effective enhanced power saving.

OBJECT AND ADVANTAGES OF THE INVENTION

Accordingly, several objects and advantages of the present invention are to provide convenient, economical and effective apparatus for prolonging rechargeable battery life and power in a wireless communicating hand-held system.

It is another object of the invention to eliminate a complexity of the wireless communicating hand-held system power saving means, such as portable cellular telephones and pagers.

It is still another object of the invention to reduce the quantity of the charging cycles from alternative current power line.

It is further object of the invention to provide possibility to use cellular telephone with the discharged regular battery in the emergency situation.

Still, further objects and advantages will become apparent from a consideration of the ensuing description accompanying drawings.

DESCRIPTION OF THE DRAWING

In order that the invention and the manner in which it is to be performed may be more clearly understood, embodiments thereof will be described by way of example with reference to the attached drawings, of which.

SUMMARY OF THE INVENTION

In view of the foregoing disadvantages inherent in the known prior art, the present invention provides a new apparatus for prolonging rechargeable battery life and power in a wireless communicating hand-held system extending the useful battery life and power of port able wireless communicating devices, such, for example, as a cellular telephones. As such, the general purpose of the present invention, which will be described hereinafter in greater details, is to provide a new convenient, economical and effective prolongation of the power supply for wireless communicating hand-held units, which has many of the advantages of the wireless communicating hand-held systems mentioned heretofore and many novel features that result in the enhanced power saving, which is not anticipated, rendered obvious, suggested or even implied by any of prior art wireless communicating hand-held apparatus.

To attain this, the present invention generally comprises a solar battery, the positive pole of which is connected to the positive pole of the rechargeable battery and to the anode of the indicating means, and the negative pole of the solar battery is connected to the first contact of the switching means and to anode of the blocking means. The cathode of the blocking means is connected to the negative pole of the rechargeable battery and the second contact of the switching means is connected to the cathode of the indicating means.

DESCRIPTION OF THE PREFERRED EMBODIMENTS

Here the description of an improved apparatus for prolonging rechargeable battery life and power in a wireless communicating hand-held system will be done in statics (as if the components of the improved apparatus are suspended in the space) with description of their relative connections to each other. The description of the functional operations of an improved apparatus will be done hereinafter.

Figure 1:
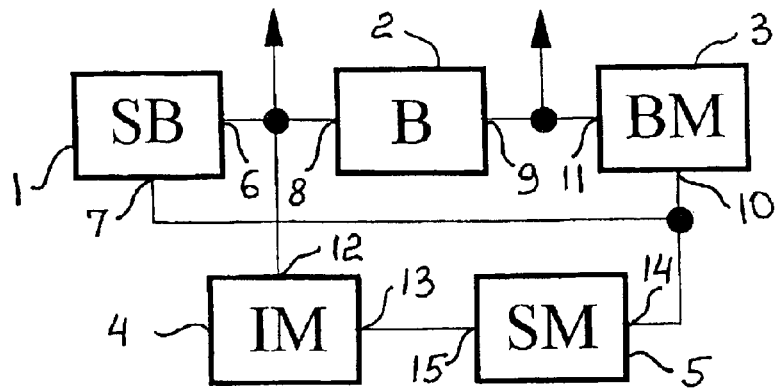
FIG. 1 is a simplified block-scheme of an improved apparatus for prolonging rechargeable battery life and power in a wireless communicating hand-held system with the indicating means and blocking means.

An improved apparatus for prolonging rechargeable battery life and power in a wireless communicating hand-held system, as shown on FIG. 1, includes a solar battery 1, the positive pole 6 of which is connected to the positive pole 8 of the rechargeable battery 2 and to the anode 12 of the indicating means 4, and the negative pole 7 of the solar battery 1 is connected to the first contact 14 of the switching means 5 and to anode 10 of the blocking means 3. The cathode 11 of the blocking means 3 is connected to the negative pole 9 of the rechargeable battery 2, and the second contact 15 of the switching means 5 is connected to the cathode 13 of the indicating means 4.

Figure 2:
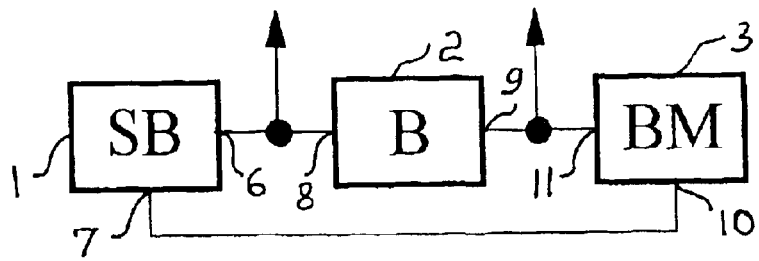
FIG. 2 is a simplified block-scheme of an improved apparatus for prolonging rechargeable battery life and power in a wireless communicating hand-held system with the blocking means.

Referring to FIG. 2, the apparatus comprises a solar battery 1, the positive pole 6 of which is connected to the positive pole 8 of the rechargeable battery 2 and the negative pole 7 of the solar battery 1 is connected to anode 10 of the blocking means 3. The cathode 11 of the blocking means 3 is connected to the negative pole 9 of the rechargeable battery 2.

Figure 3:
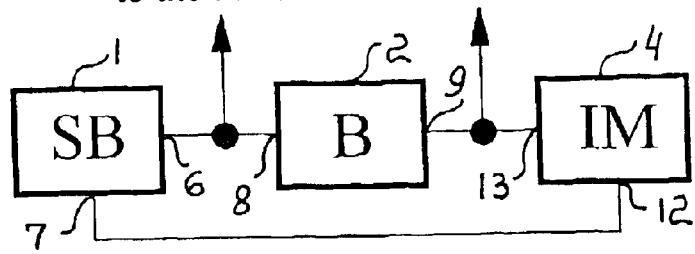
FIG. 3 is a simplified block-scheme of an improved apparatus for prolonging rechargeable battery life and power in a wireless communicating hand-held system with the indicating means.

As shown on FIG. 3, the apparatus includes a solar battery 1, the positive pole 6 of which is connected to the positive pole 8 of the rechargeable battery 2 and the negative pole 7 of the solar battery 1 is connected to anode 12 of the indicating means 4. The cathode 13 of the indicating means 4 is connected to the negative pole 9 of the rechargeable battery 2.

The solar battery 1 can, for instance, be built-in the wireless communicating hand-held unit (for example, such as cellular telephone, pager, cordless phone, etc.). The rechargeable battery 2 is a regular battery installed into each appropriate wireless communicating hand-held unit, e.g. cellular telephone. If the solar battery 1 is not built-in hand-held unit, the connection of the solar battery 1 to the contacts of the hand-held unit or contacts of the rechargeable battery 2 can be provided, for example, by thin flexible foil lanes or by wires to the telephone's charger connector.

The improved apparatus for prolonging rechargeable battery life and power in a wireless communicating hand-held system operates as follows below.

Figure 4:
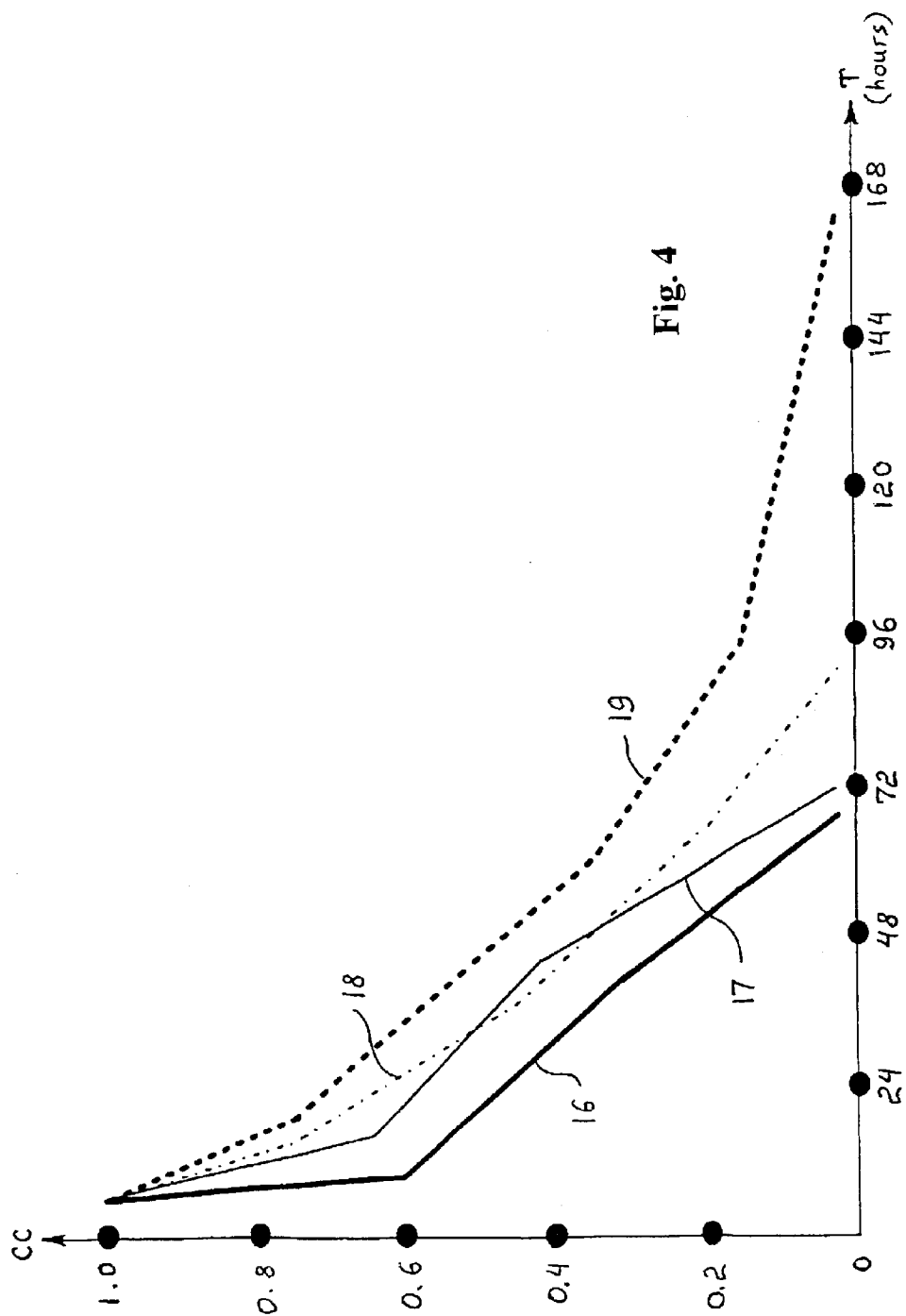
FIG. 4 is a simplified illustration (diagram) of the improved apparatus for prolonging rechargeable battery life and power in a wireless communicating hand-held system efficiency.

In the initial stage, the rechargeable battery 2 is fully charged, as shown on the diagram of FIG. 4, wherein: CC—a charged condition of battery 2 (axis of ordinates /Y/); T—a time in hours (axis of abscissas /X/), and installed into wireless communicating hand-held unit (not shown). The fully charged condition of the rechargeable battery 2 is conditionally corresponded to the mark "1.0" on the axis of ordinates in diagram of FIG. 4, and the fully discharged condition of the rechargeable battery 2 is conditionally corresponded to the mark "0" on the same axis of ordinates in diagram of FIG. 4.

The normal operation of the wireless communicating hand-held unit is provided by the regular (rechargeable) battery 2. When the regular battery 2 is discharged to the condition that is adequate to $V_B<V_{SB}$, where $V_B$—a voltage of the regular battery 2; $V_{SB}$—a voltage of the solar battery, the charging current from the solar battery 1 charges the regular battery 2. The blocking means 3 (see FIGS. 1, 2), for example a diode, provides blocking (prevention) of the regular battery 2 discharge on the solar battery 1, avoiding the solar battery burn-up by counter current (back current) from the regular battery 2 to the solar battery 1. For convenience, user can observe the conditions of the power supply, operating the switching means 5 (for example, the button-switch without fixation) shown on FIG. 1, i.e. pressing the button (not shown) of the switching means 5, user (operator) connects the indicating means 4 (for example, LED) to the circuitry. When the button of the switching means 5 is pressed and held, and $V_B>V_{SB}$, the indicating means 4 will provide no indication, and when $V_B<V_{SB}$, the indicator 4 will come up (at the button of the switching means 5 in the pressed and held position), indicating the battery 2 charging process by the solar battery 1 and/or the operation of the cellular telephone by the solar battery 1.

Referring to FIG. 3, the activity of the blocking means 3 is performed by the indicating means 4. When the power is provided by the regular cellular telephone's battery 2 ($V_B>V_{SB}$), the indicating means 4 do not indicate anything and operates as the blocking means. At the time of solar battery 1 operation ($V_{SB}>V_B$), the indicating means 4 is opened for current and indicates the use of the solar battery 1.

On FIG. 4 are presented experimental approximate diagrams illustrating the efficiency of the improved apparatus. The diagram 16 illustrates the operation of the cellular telephone with the lithium-ion rechargeable battery (400 ma per hour) in "ON" position during approximately 69 hours without solar battery and 68 minutes in the "talking" mode during that 69 hours. The diagram 17 illustrates the operation of the cellular telephone with the same lithium-ion rechargeable battery in the "STAND-BY" mode of telephone in "ON" position during approximately 72 hours without solar battery. The diagram 18 illustrates the operation of the cellular telephone with the lithium-ion rechargeable battery in "ON" position during approximately 93 hours with solar battery and 93 minutes 24 seconds in the "talking" mode during that 93 hours. The diagram 19 represents the operation of the cellular telephone with the same lithium-ion rechargeable battery in the "STAND-BY" mode of telephone in "ON" position during approximately 156 hours with solar battery.

Thus, an improved apparatus for prolonging rechargeable battery life and power in a wireless communicating hand-held system provides convenient, economical and effective power supply combination extending the useful battery life and power of portable wireless communicating units, such, for example, as a portable cellular radio telephone.

CONCLUSION, RAMIFICATION AND SCOPE

Accordingly the reader will see that, according to the invention, I have provided a apparatus for prolonging rechargeable battery life and power in a wireless communicating hand-held system, providing convenient, economical and effective prolongation of the wireless communicating handheld units. An improved apparatus has various possibilities, considering activities of the wireless communicating hand-held devices.

While the above description contains many specificities, these should be not construed as limitations on the scope of the invention, but as exemplification of the presently-preferred embodiments thereof. Many other ramifications are possible within the teaching to the invention. For example, an improved apparatus can be extremely useful for rescue in the difficult accessible areas when the regular cellular telephone's battery is fully discharged. For example, only under the light of the portable flash-lighter during 1 minute at the night time the improved apparatus can provide wireless communication during 39 seconds. Also an improved apparatus positively influences on environment, considering longer use of the regular rechargeable batteries before their disposal.

Thus, the scope of the invention should be determined by the appended claims and their legal equivalents, and not by examples given.

What is claimed is:

1. An apparatus for prolonging rechargeable battery life and power in a wireless communicating hand-held system comprising a solar battery, providing a charge of said rechargeable battery or providing said charge and an operation of said wireless communicating hand-held system, and including a positive pole connected to a positive pole of said rechargeable battery of said apparatus;

a switching means, providing the activation of an indication, and including a first contact connected to a negative pole of said solar battery and to an anode of a blocking means, providing prevention of said rechargeable battery discharge onto said solar battery, and wherein a cathode of said blocking means is connected to a negative pole of said rechargeable battery;

an indicating means, providing said indication of said charge or providing said indication of said charge and said operation of said wireless communicating hand-held system, and wherein an anode of said indicating means is connected to said positive pole of said solar battery, and a cathode of said indicating means is connected to a second contact of said switching means.

2. An apparatus for prolonging rechargeable battery life and power in a wireless communicating hand-held system comprising a solar battery, providing a charge of said rechargeable battery or providing said charge and an operation of said wireless communicating hand-held system and including a positive pole connected to a positive pole of said rechargeable battery of said apparatus;

a blocking means, providing prevention of said rechargeable battery discharge onto said solar battery, and wherein an anode of said blocking means is connected to a negative pole of said solar battery, and a cathode of said blocking means is connected to a negative pole of said rechargeable battery.

3. An apparatus for prolonging rechargeable battery life and power in a wireless communicating hand-held system comprising a solar battery, providing a charge of said rechargeable battery or providing said charge and an operation of said wireless communicating hand-held system, and including a positive pole connected to a positive pole of said rechargeable battery of said apparatus;

an indicating means, providing prevention of a discharge of said rechargeable battery onto said solar battery and providing an indication of said charge or providing said indication of said charge and said operation of said wireless communicating hand-held system, and wherein an anode of said indicating means is connected to a negative pole of said solar battery, and a cathode of said indicating means is connected to a negative pole of said rechargeable battery.

* * * * *